US010289363B2

(12) United States Patent
Kibune (10) Patent No.: US 10,289,363 B2
(45) Date of Patent: May 14, 2019

(54) IMAGE PROCESSING APPARATUS AND METHOD, AND PRINTING SYSTEM, RENDERING IMAGES IN ACCORDANCE WITH PRESENCE OF IMAGES ACROSS A TARGET RANGE IN A DIRECTION PERPENDICULAR TO A PRINT MEDIUM TRANSPORT DIRECTION (71) Applicant: SEIKO EPSON CORPORATION, Tokyo (JP)

(72) Inventor: Shusuke Kibune, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/874,340

(22) Filed: Jan. 18, 2018

(65) Prior Publication Data
US 2018/0217795 A1 Aug. 2, 2018

(30) Foreign Application Priority Data
Jan. 30, 2017 (JP) ................. 2017-013921

(51) Int. Cl.
H04N 1/405 (2006.01)
G06K 15/02 (2006.01)
(Continued)

(52) U.S. Cl.
CPC ........... *G06F 3/1251* (2013.01); *G06F 3/124* (2013.01); *G06F 3/1208* (2013.01); *G06F 3/1212* (2013.01); *G06F 3/1247* (2013.01); *G06K 15/1836* (2013.01); *G06K 15/1857* (2013.01); *G06K 15/1881* (2013.01); *H04N 1/00037* (2013.01); *H04N 1/0096* (2013.01); *H04N 1/405* (2013.01); *B41J 2/01* (2013.01); *G06F 3/122* (2013.01); *G06K 15/1861* (2013.01); *H04N 1/387* (2013.01)

(58) Field of Classification Search
CPC .......... G06K 15/1836; G06K 15/1857; G06K 15/1861; G06K 15/1881; H04N 1/00931; H04N 1/00933; H04N 1/0096; H04N 1/405; G06F 3/1212; G06F 3/122; G06F 3/124; G06F 3/1247; G06F 3/1251
See application file for complete search history.

(56) References Cited

U.S. PATENT DOCUMENTS
2018/0129457 A1* 5/2018 Akiyama ........... G03G 15/6517
2018/0217793 A1* 8/2018 Kamijima ............. G06F 3/1229

FOREIGN PATENT DOCUMENTS
JP 2002-091748 3/2002

* cited by examiner

Primary Examiner — Scott A Rogers
(74) Attorney, Agent, or Firm — Workman Nydegger (57) ABSTRACT The invention includes an arrangement determiner that determines an arrangement of a plurality of images, a rendering processor that performs rendering on the plurality of images in accordance with a result of detection processing for detecting an off line, on which none of the images are present across a target range in a second direction perpendicular to a first direction in which a print medium is transported, in the target range including the plurality of images arranged in accordance with a determination performed by the arrangement determiner, and a halftone processor that performs halftone processing on the images on which the rendering has been performed and outputs to the printing apparatus the images on which the halftone processing has been performed.

7 Claims, 10 Drawing Sheets (51) Int. Cl.
*H04N 1/00* (2006.01)
*G06F 3/12* (2006.01)
*H04N 1/387* (2006.01)
*B41J 2/01* (2006.01)

IMAGE PROCESSING APPARATUS AND METHOD, AND PRINTING SYSTEM, RENDERING IMAGES IN ACCORDANCE WITH PRESENCE OF IMAGES ACROSS A TARGET RANGE IN A DIRECTION PERPENDICULAR TO A PRINT MEDIUM TRANSPORT DIRECTION

CROSS-REFERENCE TO RELATED APPLICATIONS

The present application claims priority to Japanese Patent Application No. 2017-013921, filed Jan. 30, 2017, which is hereby incorporated by reference in its entirety.

BACKGROUND

1. Technical Field

The present invention relates to an image processing technique for performing rendering and halftone processing on an image.

2. Related Art

A technique for reducing delays in starting printing due to the time required to generate page data from print data is described in JP-A-2002-091748. More specifically, a printer controller described in JP-A-2002-091748 divides a print job into a plurality of divided jobs at boundaries between pages and sends each divided job to a printing apparatus.

However, since the above-described technique divides a print job at boundaries between pages, the technique has limitations in application range. As a specific example, the technique cannot be applied in a case of printing a plurality of images arranged by nesting on a rolled print medium, because the concept of a page does not exist in such a case. Therefore, another technique for enabling a quick start of printing without having to be concerned with the concept of a page has been required in some cases.

SUMMARY

An advantage of some aspects of the invention is to provide a technique for enabling a quick start of printing.

An image processing apparatus according to an aspect of the invention includes an arrangement determiner, a rendering processor, and a halftone processor. The arrangement determiner determines an arrangement of a plurality of images. The rendering processor performs rendering on the plurality of images in accordance with a result of detection processing for detecting an off line, on which none of the images are present across a target range in a second direction perpendicular to a first direction in which a print medium is transported in a printing apparatus, in the target range including the plurality of images arranged in accordance with a determination performed by the arrangement determiner. The halftone processor performs halftone processing on the images on which the rendering has been performed by the rendering processor and outputs to the printing apparatus the images on which the halftone processing has been performed. After performing the rendering on a first image on a downstream side in the first direction with respect to the off line among the plurality of images, the rendering processor performs the rendering on a second image on an upstream side in the first direction with respect to the off line among the plurality of images. The halftone processor performs the halftone processing on the first image, on which the rendering has been performed by the rendering processor, in parallel with the rendering on the second image performed by the rendering processor.

A printing system according to another aspect of the invention includes an image processing apparatus and a printing apparatus that transports a print medium in a first direction and prints on the print medium a plurality of images output from the image processing apparatus. The image processing apparatus includes an arrangement determiner that determines an arrangement of the plurality of images, a rendering processor that performs rendering on the plurality of images in accordance with a result of detection processing for detecting an off line, on which none of the images are present across a target range in a second direction perpendicular to the first direction, in the target range including the plurality of images arranged in accordance with a determination performed by the arrangement determiner, and a halftone processor that performs halftone processing on the images on which the rendering has been performed by the rendering processor and outputs to the printing apparatus the images on which the halftone processing has been performed. After performing the rendering on a first image on a downstream side in the first direction with respect to the off line among the plurality of images, the rendering processor performs the rendering on a second image on an upstream side in the first direction with respect to the off line among the plurality of images. The halftone processor performs the halftone processing on the first image, on which the rendering has been performed by the rendering processor, in parallel with the rendering on the second image performed by the rendering processor.

An image processing method according to a further aspect of the invention includes determining an arrangement of a plurality of images, performing rendering on the plurality of images in accordance with a result of detection processing for detecting an off line, on which none of the images are present across a target range in a second direction perpendicular to a first direction in which a print medium is transported in a printing apparatus, in the target range including the plurality of images arranged in accordance with a determination, performing halftone processing on the images on which the rendering has been performed, and outputting to the printing apparatus the images on which the halftone processing has been performed. While performing rendering, after the rendering is performed on a first image on a downstream side in the first direction with respect to the off line among the plurality of images, the rendering is performed on a second image on an upstream side in the first direction with respect to the off line among the plurality of images. While performing halftone processing, the halftone processing on the first image, on which the rendering has been performed, is performed in parallel with the rendering on the second image.

In these aspects (the image processing apparatus, the printing system, and the image processing method) of the invention configured as described above, the off line, on which none of the images are present in the second direction perpendicular to the first direction in which the print medium is transported in the printing apparatus, is detected. The plurality of images is divided by the off line into the first image and the second image, and the rendering and the halftone processing are performed on the first image and the second image in order. More specifically, after the rendering on the first image is completed, the halftone processing on the first image is performed in parallel with the rendering on the second image. That is, the halftone processing on the first image is performed immediately, without waiting until the rendering on the second image is completed. The images on which the halftone processing has been performed are then output to the printing apparatus. As a result, a quick start of printing may be realized.

It is preferable that the image processing apparatus be configured such that the rendering processor has a function of calculating an upstream end and a downstream end of each of the images in the first direction and performs the rendering in order from one of the images having a downstream end located on a most downstream side in the first direction. In the detection processing, in a case in which a downstream end of an image, on which the rendering is to be performed next among the images, is on an upstream side in the first direction at a location further than the most upstream end of an image among upstream ends of the images on which the rendering has been performed, it is determined that the off line is present between the image on which the rendering is to be performed next and the most upstream end of the image on which the rendering has been performed. With this configuration, the off line may be accurately detected.

It is also preferable that the image processing apparatus be configured such that, in the detection processing, the rendering processor detects the off line by scanning the target range in the second direction before starting the rendering, and starts the rendering on the first image on the downstream side in the first direction with respect to the detected off line. With this configuration, the off line may be accurately detected.

It is also preferable that the image processing apparatus be configured to further include a memory unit that stores the first image, which has been rendered by the rendering processor, until the halftone processor completes the halftone processing on the first image. With this configuration, the memory unit enables the first image, on which halftone processing has not been completed, to be stored. In addition, since the memory unit needs to store only the first image divided by the off line from the second image, a capacity required for the memory unit may be reduced.

It is also preferable that the printing system be configured such that, when a certain amount of data of the images output from the image processing apparatus is accumulated, the printing apparatus starts printing. After finishing the printing of the images up to the off line, the printing apparatus suspends the printing until another certain amount of data of the images is accumulated. With this configuration, while the plurality of images is divided by the off line, printing of the images may be more efficient.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
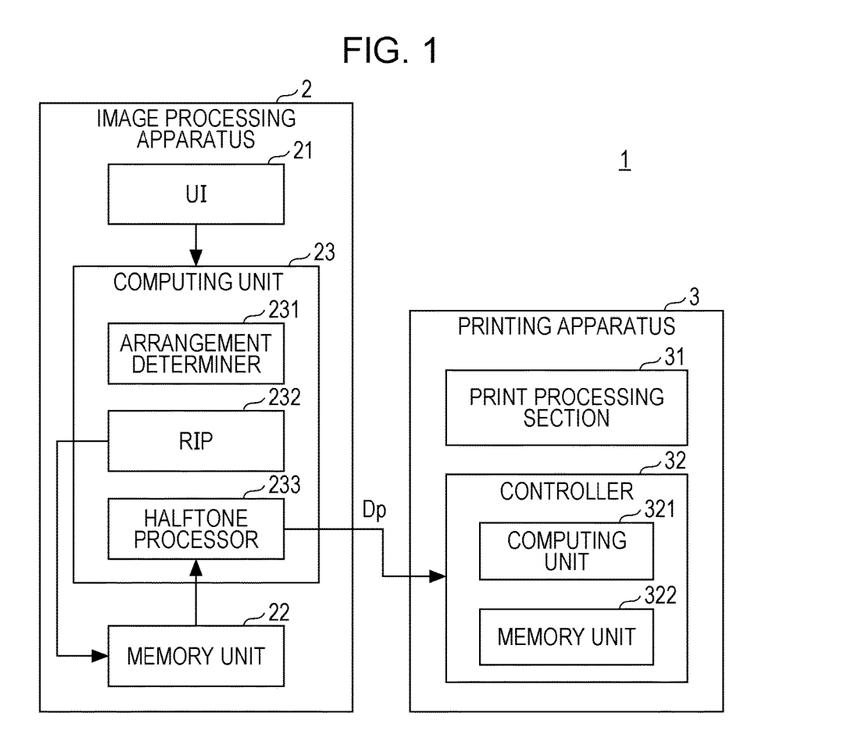
FIG. 1 is a diagram illustrating an example of a printing system according to the invention.

FIG. 1 is a diagram illustrating an example of a printing system according to the invention. A printing system 1 includes an image processing apparatus 2 that generates print data Dp and a printing apparatus 3 that performs printing based on the print data Dp. The image processing apparatus 2, which is, for example, a personal computer, includes a user interface (UI) 21, a memory unit 22, and a computing unit 23. The UI 21, which is constituted by at least one input device, such as a mouse or a keyboard, and an output device, such as a display, receives an input operation by a user and displays information for a user. The UI 21 may be a touch panel in which an input device and an output device are integrally provided. The memory unit 22, which may be constituted by a hard disk drive (HDD), stores software installed on the image processing apparatus 2 and various types of data. The computing unit 23, which may be constituted by a central processing unit (CPU) and a random access memory (RAM), performs, for example, an operation in accordance with software.

In the image processing apparatus 2, when a print command is entered by a user via the UI 21, the computing unit 23 generates print data Dp corresponding to an image indicated by the print command and outputs the print data Dp to the printing apparatus 3. The computing unit 23 implements, by executing software, an arrangement determiner 231, a raster image processor (RIP) 232, and a halftone processor 233. The arrangement determiner 231 performs nesting on a plurality of images (image data) indicated by a print command. Here, nesting is a processing operation in which an arrangement of a plurality of images indicated by a print command received by the UI 21 is determined so as to reduce blank space. The RIP 232 performs rendering (rasterizing) on the images (image data). The halftone processor 233 performs halftone processing on the rendered images (raster data). In this manner, print data Dp is generated. A method for generating print data Dp will be described in more detail below.

The printing apparatus 3 includes a print processing section 31 that serves as part of a mechanical configuration for performing printing and a controller 32 that controls an operation of the print processing section 31. The controller 32 includes a computing unit 321 and a memory unit 322. The computing unit 321, which may be constituted by a CPU and a RAM, performs operations required to control the print processing section 31. The memory unit 322, which may be constituted by a HDD, stores print data Dp received from the image processing apparatus 2.

Figure 2:
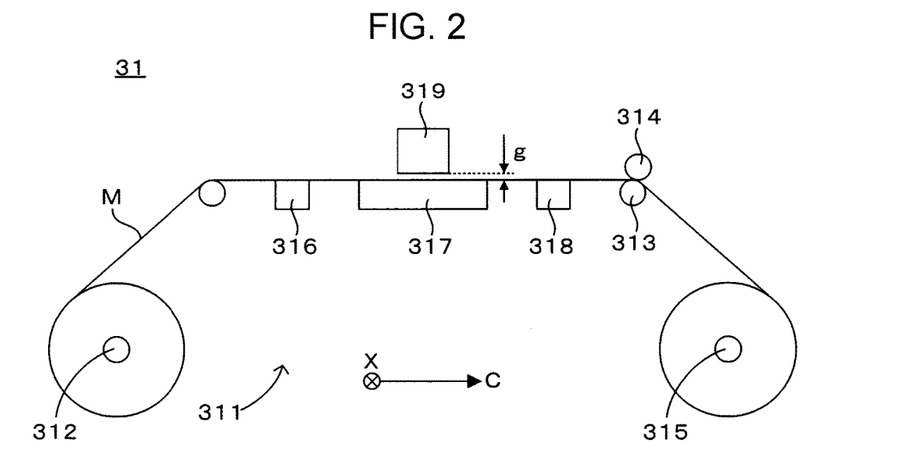
FIG. 2 is a schematic diagram illustrating an example of a print processing section of a printing apparatus.

FIG. 2 is a schematic diagram illustrating an example of a print processing section of a printing apparatus. The print processing section 31 of the printing apparatus 3 includes a transport unit 311 that transports a print medium M (roll paper) in a transport direction C by a roll-to-roll method. The transport unit 311 has a feed roller 312, a pair of rollers 313 and 314, and a winding roller 315, which are arranged in this order in the transport direction C of the print medium M. The feed roller 312 feeds the rolled print medium M in the transport direction C. The pair of the rollers 313 and 314 pinches the print medium M fed by the feed roller 312. The roller 314 is urged by the roller 313 and imposes a certain load on the print medium M. Meanwhile, the roller 313, by applying certain torque on the print medium M, transports the print medium M in the transport direction C while applying certain tension on the print medium M. The winding roller 315 then winds the print medium M transported from the pair of the rollers 313 and 314.

The print processing section 31 of the printing apparatus 3 also has a pre-heater 316, a platen heater 317, and a post-heater 318, which are arranged in this order in the transport direction C between the feed roller 312 and the roller 313. Areas of the print medium M in contact with upper surfaces of the pre-heater 316, the platen heater 317, and the post-heater 318 are heated. The print processing section 31 of the printing apparatus 3 also has a print head 319 facing the platen heater 317 with a certain platen gap g between the print head 319 and the platen heater 317. The print head 319 discharges ink by the ink jet method onto the print medium M supported by the platen heater 317.

In the print processing section 31 of the printing apparatus 3, the transport unit 311 intermittently transports the print medium M in the transport direction C and transports an unprinted area of the print medium M onto the platen heater 317. The print head 319 subsequently performs main scanning for discharging ink while moving in a main scanning direction X perpendicular to the transport direction C. Here, the number of main scanning operations (the number of passes) to be performed by the print head 319 may be set as appropriate. The number of times that the print head 319 performs the main scanning is equal to the preset number of passes. In this manner, the print head 319 performs the main scanning under the control of the controller 32, and thus an image indicated by print data Dp is printed on the print medium M on the platen heater 317.

Figure 3:
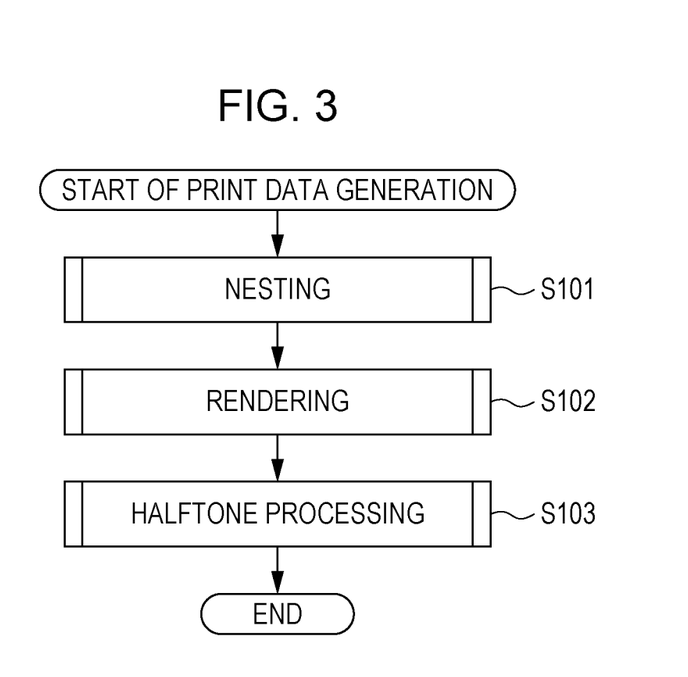
FIG. 3 is a flowchart illustrating an example of a method for generating print data by using an image processing apparatus.

In the printing system 1, print data Dp is generated by the image processing apparatus 2. FIG. 3 is a flowchart illustrating an example of a method for generating print data by using an image processing apparatus. In FIG. 3, a case in which a print command for performing nesting printing for a plurality of images is input via the UI 21 is particularly illustrated. In this case, the nesting by the arrangement determiner 231 (S101), the rendering by the RIP 232 (S102), and the halftone processing by the halftone processor 233 (S103) are performed in this order, resulting in generation of print data Dp.

Figure 4:
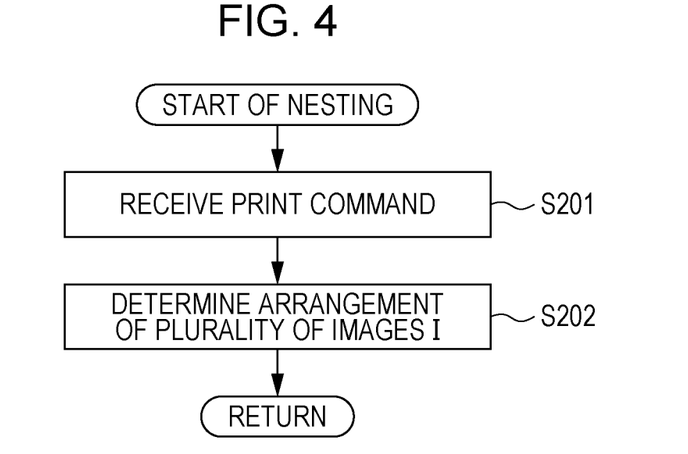
FIG. 4 is a flowchart illustrating an example of nesting.

FIG. 4 is a flowchart illustrating an example of nesting performed in S101 in FIG. 3. The arrangement determiner 231 receives a print command input via the UI 21 (S201). Here, a print command for performing the nesting printing on a plurality (a number N) of images I is received. The arrangement determiner 231 then determines an arrangement of the plurality of images I (S202). In this process, an arrangement is determined such that the plurality of images I are two-dimensionally arranged in the transport direction C and in the scanning direction X.

Figure 5:
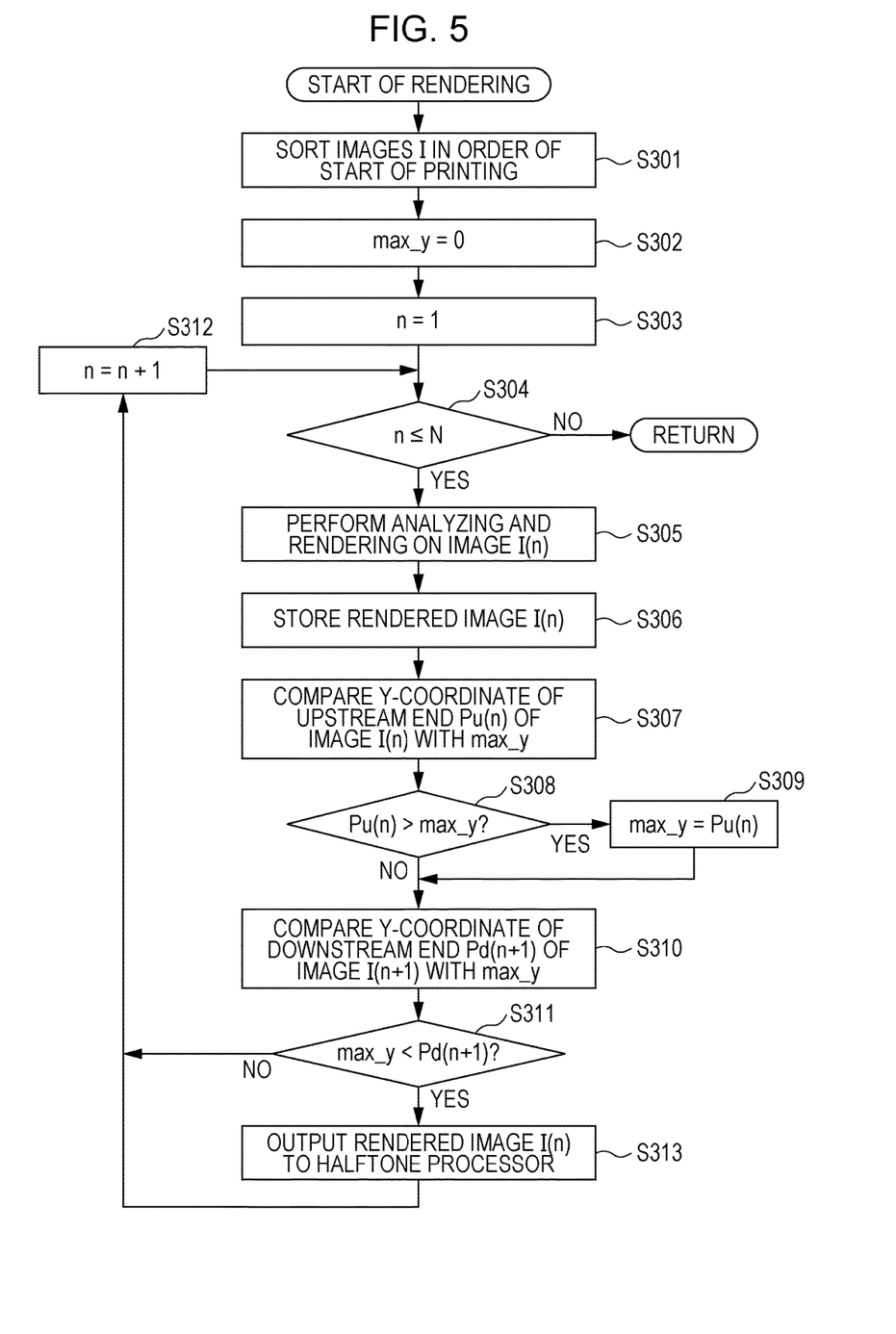
FIG. 5 is a flowchart illustrating an example of rendering.

FIG. 5 is a flowchart illustrating an example of rendering performed in S102 in FIG. 3. FIGS. 6 to 11 are schematic diagrams illustrating processing performed during the rendering. In FIGS. 6 to 11, an X-Y coordinate system having the scanning direction X and a printing direction Y is illustrated. Here, the printing direction Y is opposite to the transport direction C.

Figure 6:
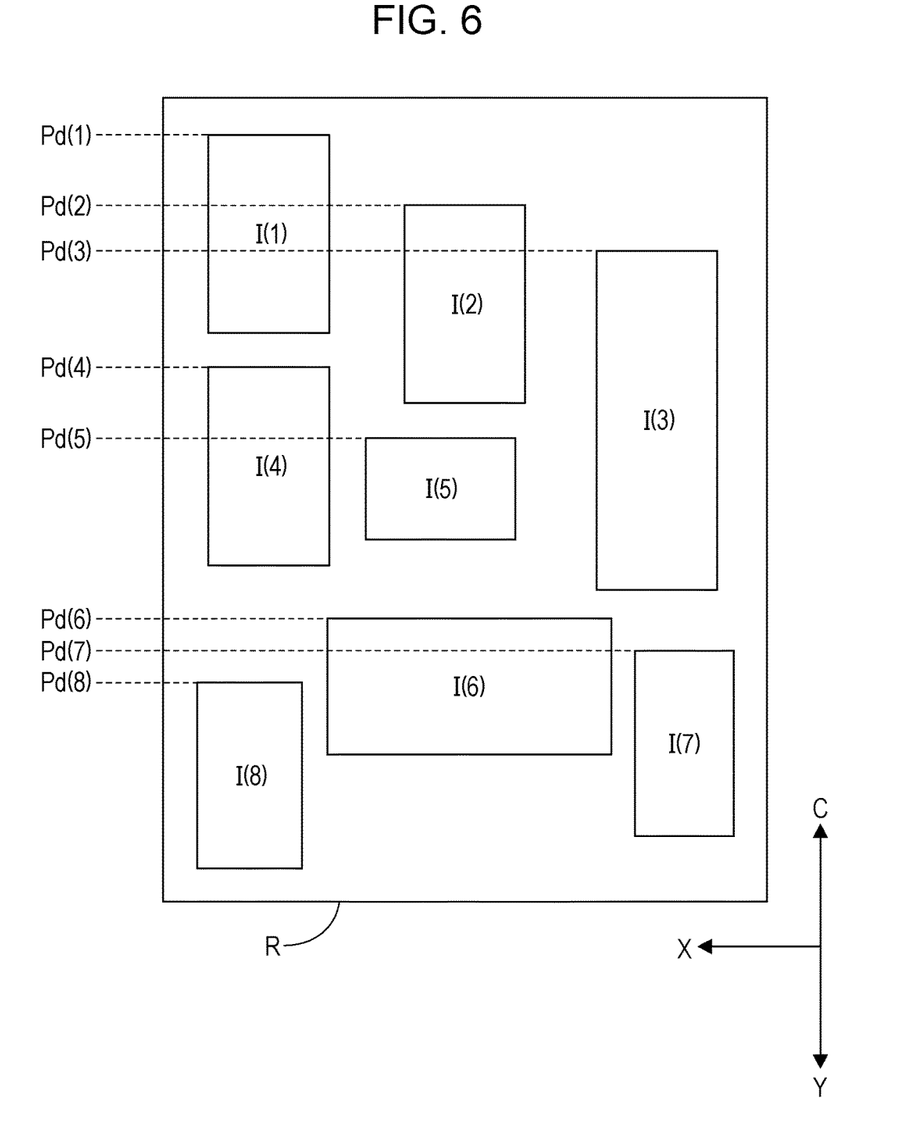
FIG. 6 is a schematic diagram illustrating processing performed in the rendering.

A number N of images I are sorted in order of start of printing (S301). FIG. 6 illustrates a state in which a number N of images (eight images) I are sorted in S301. As described above, in the printing apparatus 3, an image is printed by discharging ink from the print head 319 onto the print medium M being transported in the transport direction C. Accordingly, printing is performed in order from a downstream side to an upstream side in the transport direction C. In other words, the printing is performed in order from an upstream side to a downstream side in the printing direction Y. Thus, in S301, as illustrated in FIG. 6, in accordance with the order of position of downstream ends Pd of the images I in the transport direction C relative to a downstream side in the transport direction C, the sort order of the number N of the images I, which is indicated by numbers in parentheses on the images I, is determined. It should be noted that the RIP 232 calculates a downstream end Pd position and an upstream end Pu position of each of the images I in the transport direction C as coordinates in the printing direction Y (Y-coordinates). Thus, in S301, the sort order of the number N of the images I is determined in accordance with the ascending order of Y-coordinates of downstream ends Pd of the images I.

Next, a parameter max_y is reset to 0 (S302). The parameter max_y indicates a position of an upstream end Pu having the largest Y-coordinate among the upstream ends Pu of the images I rendered in S306, which is to be described below. That is, the parameter max_y indicates a position of a most upstream end Pu in the transport direction C among the upstream ends Pu of the rendered images I. Next, a count value n, which indicates one of the images I on which S304 to S311 are to be performed, is reset to 1 (S303). If the count value n is equal to or less than N (YES in S304), S305 to S311 are performed on an image I(n).

Figure 7:
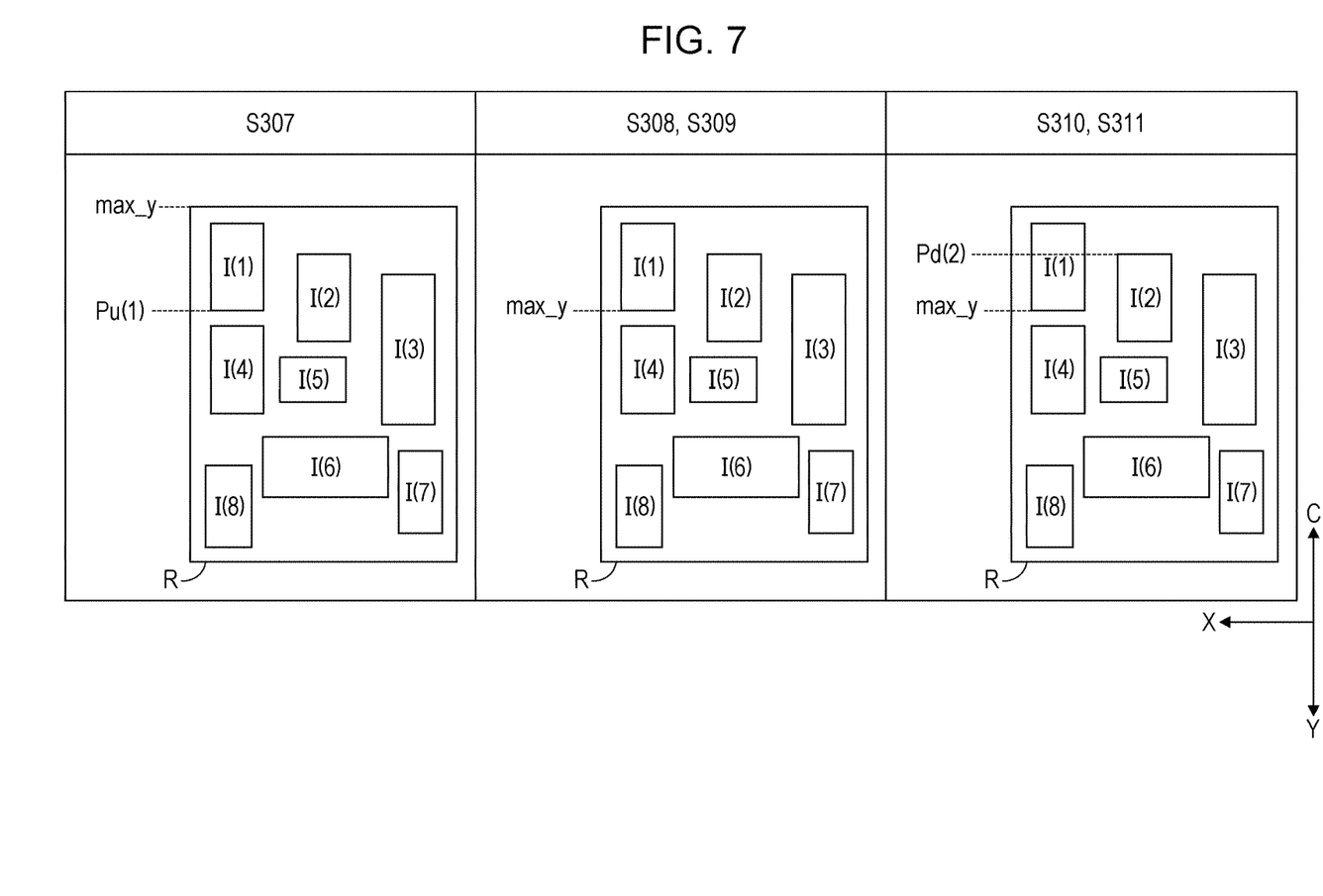
FIG. 7 is a schematic diagram illustrating processing performed in the rendering.
Figure 8:
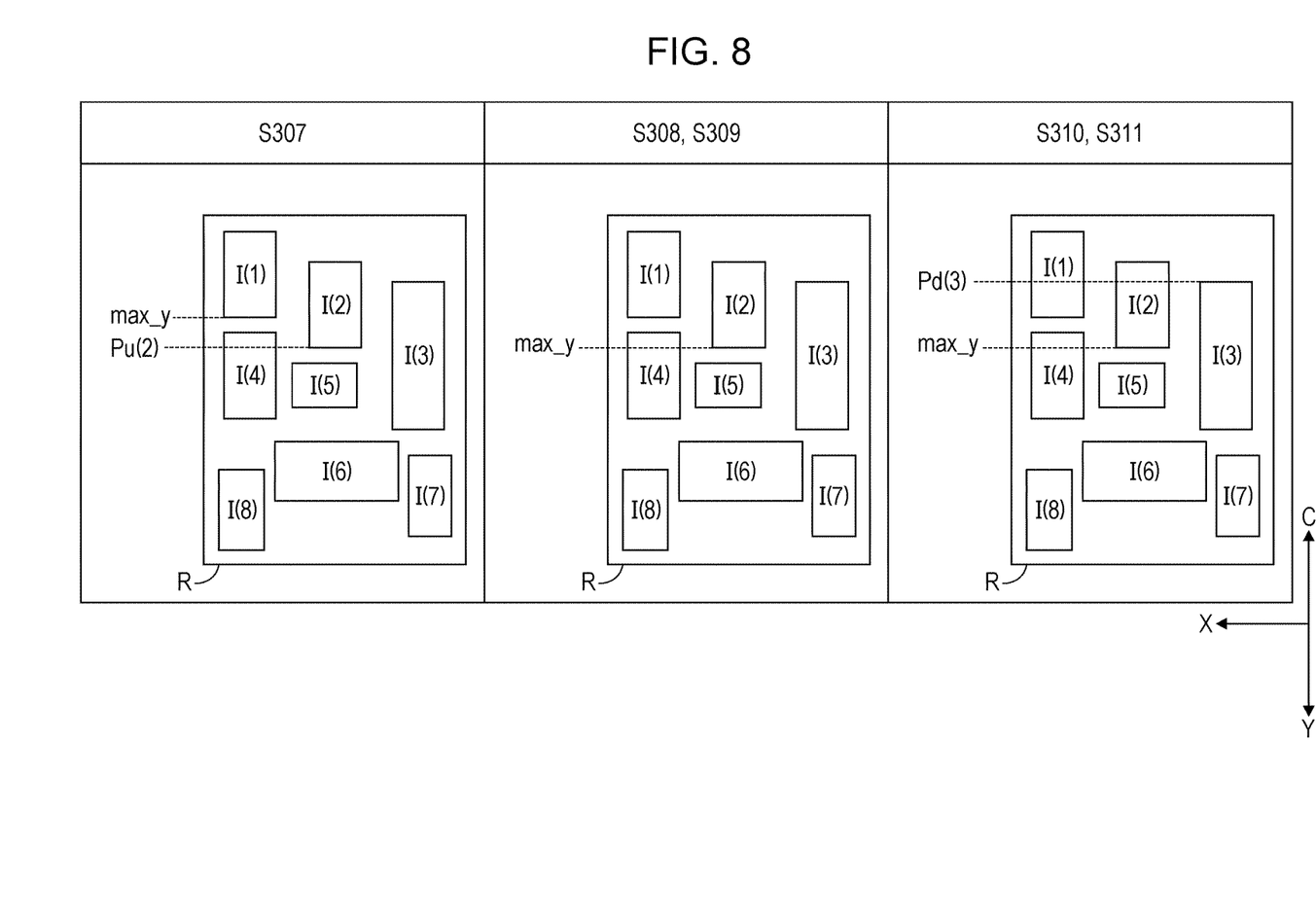
FIG. 8 is a schematic diagram illustrating processing performed in the rendering.
Figure 9:
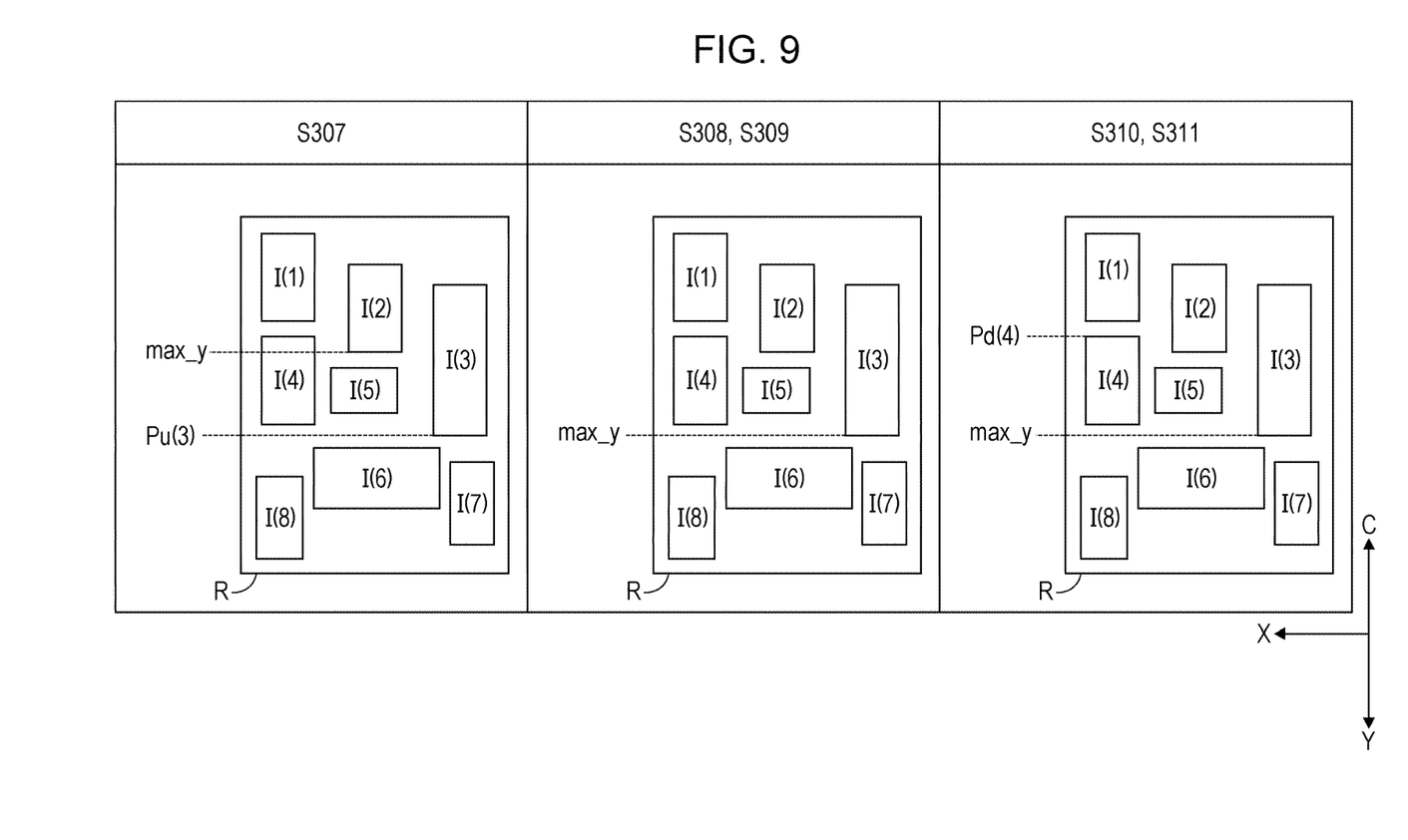
FIG. 9 is a schematic diagram illustrating processing performed in the rendering.
Figure 10:
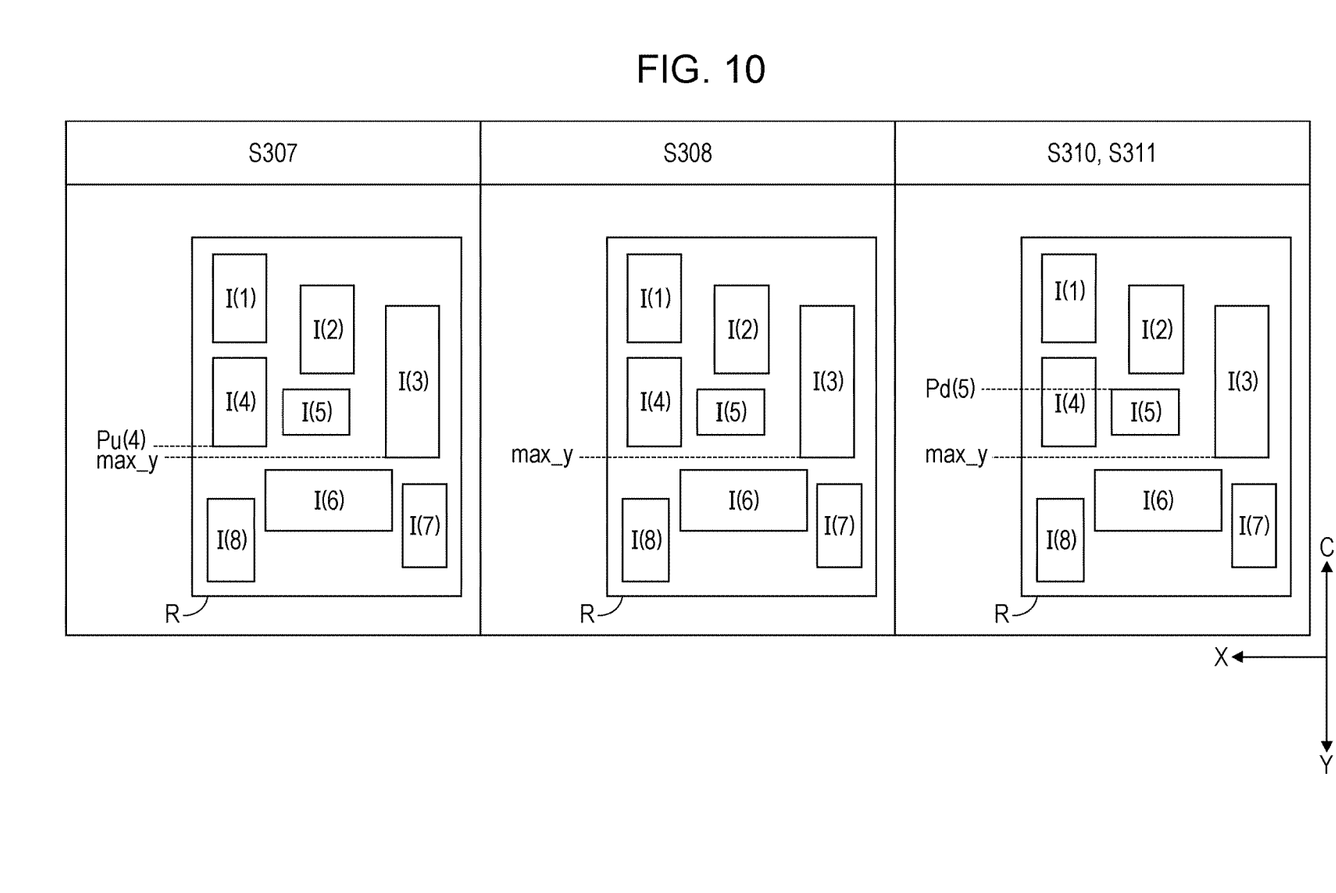
FIG. 10 is a schematic diagram illustrating processing performed in the rendering.

A case in which n=1 is described here with additional reference to FIG. 7. The rendering is performed on an image I(1) in accordance with a result of analysis of the image I(1) (S305). The rendered image I(1) is then stored in the memory unit 22 (S306). A Y-coordinate of an upstream end Pu(1) of the image I(1) is compared with the parameter max_y (S307). In this example, since the Y-coordinate of the upstream end Pu(1) is larger than the parameter max_y (YES in S308), the parameter max_y is changed from 0 to the Y-coordinate of the upstream end Pu(1) (S309). A Y-coordinate of a downstream end Pd(2) of an image I(2), on which the rendering is to be performed next, is compared with the parameter max_y (S310). In this example, since the Y-coordinate of the downstream end Pd(2) is smaller than the parameter max_y (NO in S311), the count value n is incremented by 1 (S312). The process flow then returns to S304.

Since the count value n (n=2) is less than N (N=8), S305 to S311 are performed on the image I(2). This case is described with additional reference to FIG. 8. The rendering is performed on the image I(2) in accordance with a result of analysis of the image I(2) (S305). The rendered image I(2) is then stored in the memory unit 22 (S306). A Y-coordinate of an upstream end Pu(2) of the image I(2) is compared with the parameter max_y (S307). In this example, since the Y-coordinate of the upstream end Pu(2) is larger than the parameter max_y (YES in S308), the parameter max_y is changed from the Y-coordinate of the upstream end Pu(1) to the Y-coordinate of the upstream end Pu(2) (S309). A Y-coordinate of a downstream end Pd(3) of an image I(3), on which the rendering is to be performed next, is compared with the parameter max_y (S310). In this example, since the Y-coordinate of the downstream end Pd(3) is smaller than the parameter max_y (NO in S311), the count value n is incremented by 1 (S312). The process flow then returns to S304.

Since the count value n (n=3) is less than N (N=8), S305 to S311 are performed on the image I(3). This case is described with additional reference to FIG. 9. The rendering is performed on the image I(3) in accordance with a result of analysis of the image I(3) (S305). The rendered image I(3) is then stored in the memory unit 22 (S306). A Y-coordinate of an upstream end Pu(3) of the image I(3) is compared with the parameter max_y (S307). In this example, since the Y-coordinate of the upstream end Pu(3) is larger than the parameter max_y (YES in S308), the parameter max_y is changed from the Y-coordinate of the upstream end Pu(2) to the Y-coordinate of the upstream end Pu(3) (S309). A Y-coordinate of a downstream end Pd(4) of an image I(4), on which the rendering is to be performed next, is compared with the parameter max_y (S310). In this example, since the Y-coordinate of the downstream end Pd(4) is smaller than the parameter max_y (NO in S311), the count value n is incremented by 1 (S312). The process flow then returns to S304.

Since the count value n (n=4) is less than N (N=8), S305 to S311 are performed on the image I(4). This case is described with additional reference to FIG. 10. The rendering is performed on the image I(4) in accordance with a result of analysis of the image I(4) (S305). The rendered image I(4) is then stored in the memory unit 22 (S306). A Y-coordinate of an upstream end Pu(4) of the image I(4) is compared with the parameter max_y (S307). In this example, since the Y-coordinate of the upstream end Pu(4) is smaller than the parameter max_y (NO in S308), the parameter max_y maintains the Y-coordinate of the upstream end Pu(3). A Y-coordinate of a downstream end Pd(5) of an image I(5), on which the rendering is to be performed next, is compared with the parameter max_y (S310). In this example, since the Y-coordinate of the downstream end Pd(5) is smaller than the parameter max_y (NO in S311), the count value n is incremented by 1 (S312). The process flow then returns to S304.

Since the count value n (n=5) is less than N (N=8), S305 to S311 are performed on the image I(5). This case is described with additional reference to FIG. 11. The rendering is performed on the image I(5) in accordance with a result of analysis of the image I(5) (S305). The rendered image I(5) is then stored in the memory unit 22 (S306). A Y-coordinate of an upstream end Pu(5) of the image I(5) is compared with the parameter max_y (S307). In this example, since the Y-coordinate of the upstream end Pu(5) is smaller than the parameter max_y (NO in S308), the parameter max_y maintains the Y-coordinate of the upstream end Pu(3). A Y-coordinate of a downstream end Pd(6) of an image I(6), on which the rendering is to be performed next, is compared with the parameter max_y (S310).

Figure 11:
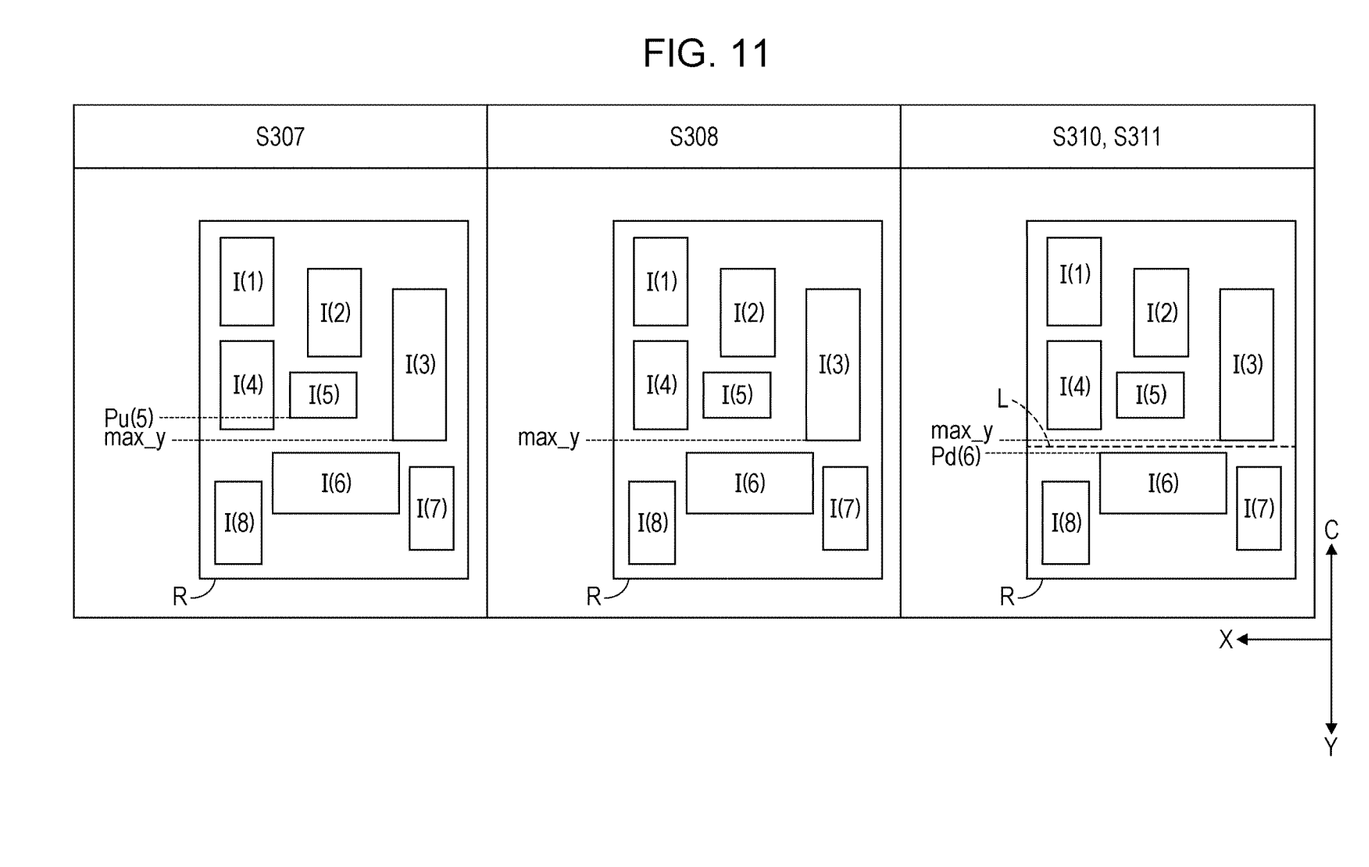
FIG. 11 is a schematic diagram illustrating processing performed in the rendering.

In this example, the Y-coordinate of the downstream end Pd(6) is larger than the parameter max_y (YES in S311). In this case, the RIP 232 determines that an off line L is present between the upstream end Pu(3) of the image I(3), whose Y-coordinate is set as the parameter max_y, and the downstream end Pd(6) of the image I(6), on which rendering is to be performed next. Here, off line L is a linear area parallel to the scanning direction X on which none of the images I are present across a target range R including a number N of the images I in the scanning direction X.

When detecting the off line L in this manner, the RIP 232 outputs to the halftone processor 233 the images I arranged on a downstream side in the transport direction C with respect to the off line L, that is, the rendered images I(1) to I(5) (raster data) accumulated in the memory unit 22 (S313). After the count value n is incremented by 1 (S312), the process flow returns to S304. The processing operation is repeated until the count value exceeds N.

Figure 12:
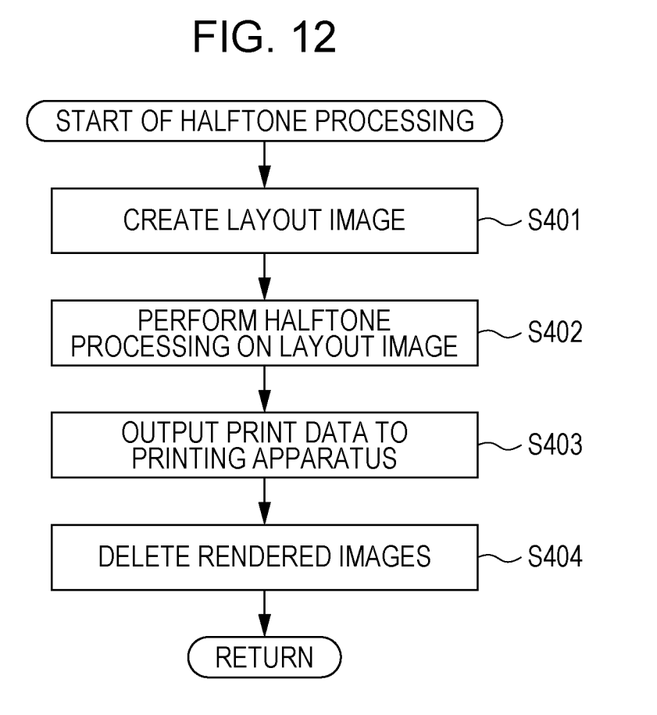
FIG. 12 is a flowchart illustrating an example of halftone processing.

FIG. 12 is a flowchart illustrating an example of halftone processing performed in S103 in FIG. 3. The halftone processing on the images I(1) to I(5) that are output to the halftone processor 233 is performed in parallel with the rendering (S304 to 312) on the subsequent images I(6) to I(8). More specifically, a layout image, in which the images I(1) to I(5) are arranged in accordance with the determination in S202, is created (S401). The halftone processing is performed on the layout image (S402). The print data Dp generated in this manner is output from the halftone processor 233 to the printing apparatus 3 (S403). After the halftone processing on the images I(1) to I(5) is completed, the images I(1) to I(5) are deleted from the memory unit 22 (S404).

In the printing apparatus 3, the controller 32 causes the memory unit 322 to accumulate the print data Dp received from the halftone processor 233. When the amount of the print data Dp accumulated in the memory unit 322 reaches a certain amount, the controller 32 causes the print processing section 31 to start printing based on the print data Dp. In this manner, the print processing section 31 performs the printing of the images I up to the off line L on the print medium M. After the printing up to the off line L is performed, the controller 32 suspends the printing performed by the print processing section 31 until another certain amount of print data Dp is accumulated in the memory unit 322.

In the embodiment configured as described above, the off line L on which none of the images I are present in the scanning direction X is detected (S311). Accordingly, the plurality of images I is divided by the off line L into a group of the images I(1) to I(5) (a first image) and a group of the images I(6) to I(8) (a second image), and the rendering and the halftone processing are performed on each group in order. More specifically, after the rendering on the images I(1) to I(5) is completed, the halftone processing on the images I(1) to I(5) is performed in parallel with (in other words, synchronously with) the rendering on the images I(6) to I(8). That is, the halftone processing on the image I(1) to I(5) is performed immediately, without waiting until the rendering on the images I(6) to I(8) is completed. The images I(1) to I(5) (print data Dp), on which the halftone processing has been performed, are then output to the printing apparatus 3. As a result, a quick start of printing may be realized.

In this case, the rendering is performed in order from one of the images I having a downstream end Pd located on the most downstream side in the transport direction C. In S311 (detection processing), in a case in which a downstream end Pd of an image I, on which the rendering is to be performed next among the images I, is on an upstream side in the transport direction C with respect to a position at which the parameter max_y is set, it is determined that the off line L is present between the image I on which rendering is to be performed next and the position at which the parameter max_y is set. In this manner, the off line L may be accurately detected.

Moreover, the memory unit 22, which stores the images I rendered by the RIP 232 until the halftone processor 233 completes the halftone processing on the images I, is provided. The memory unit 22 enables the images I, on which the halftone processing has not been completed, to be stored. In addition, since the memory unit 22 needs to store only the images I (the images I(1) to I(5) in the above-described example) divided by the off line L from the subsequent images I, a capacity required for the memory unit 22 may be reduced.

Furthermore, when a certain amount of data of the images I (print data Dp) output from the image processing apparatus 2 is accumulated, the printing apparatus 3 starts printing. After finishing the printing of the images I up to the off line L, the printing apparatus 3 suspends the printing until another certain amount of data of the images I is accumulated. In this manner, while the plurality of images I is divided by the off line L, the printing of the images I may be more efficiently performed.

In the above-described embodiment, the printing system 1 corresponds to an example of "a printing system" of the invention, the image processing apparatus 2 corresponds to an example of "an image processing apparatus" of the invention, the printing apparatus 3 corresponds to an example of "a printing apparatus" of the invention, the arrangement determiner 231 corresponds to an example of "an arrangement determiner" of the invention, the RIP 232 corresponds to an example of "a rendering processor" of the invention, the halftone processor 233 corresponds to an example of "a halftone processor" of the invention, the image I corresponds to an example of "an image" of the invention, the images I(1) to I(5) correspond to an example of "a first image" of the invention, the images I(6) to I(8) correspond to an example of "a second image" of the invention, the target range R corresponds to an example of "a target range" of the invention, the off line L corresponds to an example of "an off line" of the invention, S311 corresponds to an example of "detection processing" of the invention, the transport direction C corresponds to an example of "a first direction" of the invention, the scanning direction X corresponds to an example of "a second direction" of the invention, the upstream end Pu corresponds to an example of "an upstream end" of the invention, and the downstream end Pd corresponds to an example of "a downstream end" of the invention.

It should be noted that the invention is not limited to the above-described embodiment, and various modifications to the above-described embodiment may be made without departing from the spirit and scope of the invention. For example, the number of the images I, which are print objects, is not limited to 8 as described above.

Furthermore, although the embodiment describes an example in which one off line L is detected within the target range R including the plurality of images I, a plurality of off lines L may be detected. Even in this case, by repeating S304 to S313, whenever an off line L is detected, the halftone processing on the images I (a first image) on a downstream side with respect to the off line L may be performed in parallel with (that is, synchronously with) the rendering on the images I (a second image) on an upstream side with respect to the off line L.

Moreover, a specific method for detecting the off line L is not limited to the above-described example. For example, the RIP 232 may detect the off line L by scanning the target range R in the scanning direction X before starting the rendering (detection processing). This method may also detect the off line L accurately. In this case, the rendering on the images I (a first image) on a downstream side with respect to the detected off line L may be started before the rendering on the images I (a second image) on an upstream side with respect to the off line L.

Further, the printing apparatus 3 is not limited to the aforementioned ink jet type, but may be, for example, a laser type.

What is claimed is:

1. An image processing apparatus comprising:
   an arrangement determiner that determines an arrangement of a plurality of images;
   a rendering processor that performs rendering on the plurality of images in accordance with a result of detection processing for detecting an off line, on which none of the images are present across a target range in a second direction perpendicular to a first direction in which a print medium is transported in a printing apparatus, in the target range including the plurality of images arranged in accordance with a determination performed by the arrangement determiner; and
   a halftone processor that performs halftone processing on the images on which the rendering has been performed by the rendering processor and outputs to the printing apparatus the images on which the halftone processing has been performed, wherein
   after performing the rendering on a first image on a downstream side in the first direction with respect to the off line among the plurality of images, the rendering processor performs the rendering on a second image on an upstream side in the first direction with respect to the off line among the plurality of images, and
   the halftone processor performs the halftone processing on the first image, on which the rendering has been performed by the rendering processor, in parallel with the rendering on the second image performed by the rendering processor.

2. The image processing apparatus according to claim 1, wherein:
   the rendering processor has a function of calculating an upstream end and a downstream end of each of the images in the first direction, and performs the rendering in order from one of the images having a downstream end located on a most downstream side in the first direction; and
   in the detection processing, in a case in which a downstream end of an image, on which the rendering is to be performed next among the images, is on an upstream side in the first direction at a location further than a most upstream end of an image among upstream ends of the images on which the rendering has been performed, it is determined that the off line is present between the image on which the rendering is to be performed next and the most upstream end of the image on which the rendering has been performed.

3. The image processing apparatus according to claim 1, wherein
   the rendering processor detects, in the detection processing, the off line by scanning the target range in the second direction before starting the rendering and starts the rendering on the first image on the downstream side in the first direction with respect to the detected off line.

4. The image processing apparatus according to claim 1, further comprising
   a memory that stores the first image, which has been rendered by the rendering processor, until the halftone processor completes the halftone processing on the first image.

5. A printing system, comprising:

an image processing apparatus; and a printing apparatus that transports a print medium in a first direction and prints on the print medium a plurality of images output from the image processing apparatus, wherein the image processing apparatus includes an arrangement determiner that determines an arrangement of the plurality of images, a rendering processor that performs rendering on the plurality of images in accordance with a result of detection processing for detecting an off line, on which none of the images are present across a target range in a second direction perpendicular to the first direction, in the target range including the plurality of images arranged in accordance with a determination performed by the arrangement determiner, and a halftone processor that performs halftone processing on the images on which the rendering has been performed by the rendering processor and outputs to the printing apparatus the images on which halftone processing has been performed, after performing the rendering on a first image on a downstream side in the first direction with respect to the off line among the plurality of images, the rendering processor performs the rendering on a second image on an upstream side in the first direction with respect to the off line among the plurality of images, and the halftone processor performs the halftone processing on the first image, on which the rendering has been performed by the rendering processor, in parallel with the rendering on the second image performed by the rendering processor.

6. The printing system according to claim 5, wherein when a certain amount of data of the images output from the image processing apparatus is accumulated, the printing apparatus starts printing, and after finishing the printing of the images up to the off line, the printing apparatus suspends the printing until another certain amount of data of the images is accumulated.

7. An image processing method comprising:

determining an arrangement of a plurality of images;

performing rendering on the plurality of images in accordance with a result of detection processing for detecting an off line, on which none of the images are present across a target range in a second direction perpendicular to a first direction in which a print medium is transported in a printing apparatus, in the target range including the plurality of images arranged in accordance with a determination;

performing halftone processing on the images on which the rendering has been performed; and outputting to the printing apparatus the images on which the halftone processing has been performed, wherein in the performing rendering, after the rendering is performed on a first image on a downstream side in the first direction with respect to the off line among the plurality of images, the rendering is performed on a second image on an upstream side in the first direction with respect to the off line among the plurality of images, and in the performing halftone processing, the halftone processing on the first image, on which the rendering has been performed, is performed in parallel with the rendering on the second image.

* * * * *